US005807034A

United States Patent [19]

Perlmutter et al.

[11] Patent Number: 5,807,034

[45] Date of Patent: Sep. 15, 1998

[54] VACUUM DRILL PLATE

[75] Inventors: Jeffrey Aaron Perlmutter, Huntington Beach; Samuel Lee Babikian, Cerritos, both of Calif.

[73] Assignee: McDonnell Douglas Corporation, Huntington Beach, Calif.

[21] Appl. No.: 684,953

[22] Filed: Jul. 19, 1996

[51] Int. Cl.[6] .............................. B23B 45/14

[52] U.S. Cl. .............................. 408/67; 408/75; 408/76; 408/97

[58] Field of Search .............................. 408/67, 75, 76, 408/95, 97, 712

[56] References Cited

U.S. PATENT DOCUMENTS

| | | | |
|---|---|---|---|
| 2,910,895 | 11/1959 | Winslow | 77/13 |
| 2,946,246 | 7/1960 | Allan | 408/76 |
| 3,253,665 | 5/1966 | Schienle | 408/76 |
| 3,499,641 | 3/1970 | Peterson | 269/22 |
| 3,575,519 | 4/1971 | Bruner | 408/97 |
| 3,915,241 | 10/1975 | Bieri | 173/32 |
| 4,582,460 | 4/1986 | Silverberg | 409/175 |
| 4,764,060 | 8/1988 | Khurana | 408/97 |
| 5,033,917 | 7/1991 | McGlasson et al. | 408/67 |
| 5,393,187 | 2/1995 | Slesinski et al. | 408/67 |
| 5,482,411 | 1/1996 | McGlasson | 408/67 |
| 5,630,682 | 5/1997 | Davey | 408/67 |

FOREIGN PATENT DOCUMENTS

| | | | |
|---|---|---|---|
| 1301576 | 4/1987 | U.S.S.R. | 408/76 |

*Primary Examiner*—Daniel W. Howell
*Attorney, Agent, or Firm*—Bell Seltzer Intellectual Property Group of Alston & Bird LLP

[57] ABSTRACT

A suction grip for holding a pneumatic power tool to the surface of sheet material for drilling and counterboring holes contains a plate and a releasibly fastened cylindrical member. The plate contains a shallow region on a front face that abuts the work surface and serves as a vacuum region. The cylindrical member contains a hollow passage that receives, alternately, an alignment tool to center that passage over a locator hole in the worked material and to support a self collating pneumatic drill for drilling the worked material. A collection of collars which may be interchanged on the plate serves as a kit, permitting use with different drills.

22 Claims, 2 Drawing Sheets

VACUUM DRILL PLATE

FIELD OF THE INVENTION

This invention relates to vacuum plate apparatus used in manufacturing, and, more particularly, to a suction grip for positioning and clamping a power drill for drilling of precision holes at precise locations in metal sheets.

BACKGROUND

In the manufacture of some industrial products, the worker is called upon to drill a number of large diameter precision holes at precisely defined locations through an upstanding panel or sheet of metal material. Those holes must be precisely formed and accurately located relative to one another and with the hole axis precisely oriented relative to the sheet's surface.

A portable pneumatic drill, a power tool, is used to drill those holes, since the circumstance addressed is one in which the number of holes and the quantity of the sheets is not so large as to justify the great investment expense of an automated robotic drilling system for such drilling. As a practical matter, thus, the holes are required to be formed by each work person, essentially, one at a time. Because the sheet material is upstanding, the vertical orientation of the worked surface introduces an additional burden to repetitive handling of a heavy pneumatic drill.

One specific and significant example of that circumstance is in manufacturing aircraft wings for large aircraft. An aircraft wing is constructed from a large sheet of aluminum that is cut to shape to fit within a predefined wing assembly. This sheet offers a very large expanse of sheet material, as example thirty feet in length by twelve feet in at its maximum dimensions. Typically, the sheets surface is very slightly convexly curved.

In assembling that sheet into a wing, long thin solid rectangular metal braces, called stringers, are fastened to the sheet's underside surface. The stringers provide added structural support to the sheet material. These stringers are located in parallel rows. A typical large wing assembly may require twenty or more of such stringers. The stringers are fastened to the sheet or skin with large numbers of fastener's, typically, rivets or, more accurately, "HI LOK" fasteners.

Unlike an ordinary rivet, the HI LOK fastener contains a shank that is threaded, resembling the shank of an ordinary bolt, and a matingly threaded nut. The shank is press fit into a hole whose diameter typically is two thousandths less than the fastener's shank. Being forced into the hole, called an interference fit, the shank frictionally engages the side wall of the hole, exposing a threaded portion on the other side of the metal sheet, and the nut is threaded and torqued to that shank completing installation and providing a tight permanent grip to the sheet. That grip is as good or better than that obtained from a rivet. With hundreds of such fasteners in the wing, the total grip is strong.

Automatic machinery known as the DRIVMATIC is used to install most of the fasteners. The DRIVMATIC is a computer programmed manufacturing robot, known in the industry, that accurately positions and drills holes, counter sinks the holes, automatically inserts slug rivets into those holes and then mills the top of those fasteners to be flush with the surface of the skin. This robotic equipment automatically installs the fastener's side by side less than an inch apart along each stringer. However, before the subassembly of skin and stringers may be inserted into the DRIVMATIC machine, the stringers must already be firmly attached to the sheet. That is, the stringers must be attached firmly enough for the machine, but not the final degree of firmness obtained with the hundreds of additional fasteners required in the airframe assembly, which the DRIVMATIC machine is to install.

To prepare for insertion into the Drivmatic riveting machine, the stringers are clamped in position in parallel within spaced slots on a large manufacturing jig. The aluminum sheet, called the "skin", is laid against that jig and clamped in place, thereby orienting the skin and stringer elements for fastening. Small locator holes are drilled through the stringers and the abutting aluminum sheet at spaced intervals of about eighteen inches, oriented orthogonal to the sheet surface. It is this stage of the wing's manufacturing process at which a large number of precision holes needs to be drilled using portable pneumatic power drills.

The locator hole is then redrilled to the larger diameter required for the fastener and countersunk from the opposite surface of the aluminum sheet to the requisite accuracy, typically on the order of two thousandths of an inch in tolerance and with the requisite bore taper in order to allow the HI LOK fastener to be press fit and seated in the precision hole. Once those holes are formed, and the fastener's inserted, the subassembly is sufficiently fastened together to allow the subassembly to be worked upon in the "DRIVMATIC" machine.

Once the DRIVMATIC machine receives the wing skin and stringer assembly, with stringers properly affixed, it drills holes through the skin and stringer at spaced intervals along each stringer, automatically skipping over those positions at which a fastener was initially installed in the preceding operation, installs slug rivets into those newly drilled holes and finishes the outside surface of those rivets to be flush with the skin's surface. Those intervals are considerably shorter, on the order of an inch, than the initial holes, typically twenty four inches apart. When completed the skin appears as a sheet with the long rows of innumerable numbers of closely spaced fasteners familiar to those viewing the exterior surface of a wing.

Considering further, the process of redrilling of the starter holes. One way to enlarge starter holes is to do so in successive steps using consecutively larger diameter drill bits, with each drill bit carefully being centered in the hole being enlarged. In the prior practice, a manually positioned and located drill guide tool is used to assist in maintaining the required hole tolerances with manually fed core drills and reamers. Countersinks are formed in a subsequent operation using conventional countersink depth control tooling. The forgoing procedure obviously requires several steps, therefore takes additional time, and represents additional expense.

More modern drills accomplishes drilling and countersinking of holes in essentially one step. A commercially available portable pneumatic power drill, such as the Q-MATIC self-colleting drill motor model 15SC-C-225, marketed by Intool Inc. of Brea, Calif., with the appropriate drill bit installed, allows one to enlarge and counterbore the hole in one pass. Unfortunately that portable drill tool is somewhat cumbersome. It weighs about twenty two pounds and is about eighteen inches in length. In operation, the drill tool jerks and shakes somewhat. Workers would find such drilling tool difficult to use to successfully form the necessary precision holes.

Accordingly, an object of the invention is to provide a structure to support a self colleting pneumatic drill on an upstanding sheet being worked for drilling at a precise predefined location on that sheet within a tolerance of two thousandths of an inch or better.

The new structure makes use of a vacuum, and forms a suction grip, allowing atmospheric pressure to hold the structure and the pneumatic drill against the worked material. Such use of a vacuum region confined between a metal surface, the work, and a block to support the block on the metal surface is known. The higher pressure of the atmosphere on the outside surface of the block serves to press and hold the block against the metal surface. The strength of that temporary connection can be quite large, essentially proportional to the area of the block, and the differential in air pressure. As a hypothetical example, with an area in vacuum covering 100 square inches, and an outside air pressure of 14.7 pounds per square inch, the force exerted against the block is 1,470 pounds. With a large enough surface area, the bond is sufficient to support other equipment such as pneumatic drills, as does the present invention.

That application of a suction grip was proposed heretofore. In U.S. Pat. No. 2,910,895, granted Nov. 3, 1959 to Wilson, a unique drill and support arrangement is described in which the drill is supported upon an airplane skin by such a vacuum block. As shown in Wilson, the vacuum is obtained by running compressed air, customarily available in manufacturing plants through a Venturi unit. The rapid flow of compressed air through the Venturi vacuum unit, creates a lower pressure, the "vacuum" at an intermediate outlet, a practical application of the well known Bernoulli principle.

Another object of the invention is to provide a vacuum drill plate and collet kit that permits selection and use of any of a variety of different size collets on the drill plate as allows use with different self-colleting pneumatic drills.

Still another object of the invention is to provide a new and versatile structure for a vacuum drill plate kit, that is compact and easily maneuvered into position, that not only supports off-the-shelf pneumatic drills for precision drilling, but allows the drill to be accurately positioned in preexisting starter holes.

And an additional object of the invention is to provide a power tool vacuum type grip for supporting a self colleting pneumatic drill to a worked surface that centers the drill onto predrilled located holes in the worked surface and which may be used with a numerous self-colleting drills of differing collet diameters.

SUMMARY OF THE INVENTION

The invention supports a self-colleting drill and aids in centering of that drill in pre-formed starter holes. The invention is characterized by a rigid metal panel containing a cylindrical passage between the rear and front panel sides, and a shallow open vacuum chamber region defined by a region recessed from the faces outer surface, the rim portions, on the panels front surface bordered by a pair of compressible seals, the first of which borders the front side of the panel and the second of which borders the central opening to isolate that passage from the vacuum region. The vacuum chamber is closed when the panel's front face is pressed against the sheet material being work, and the work essentially serves as the top wall of the vacuum chamber.

A short thick walled hollow metal cylinder or collar, as variously termed, is fastened to the rear of the panel, suitably by threaded fasteners, with the collar's cylindrical passage aligned with the cylindrical passage in the panel. Preferably the latter passage is larger in diameter allowing a portion of the coller to overlie a portion of the plates passage. The pneumatic drill is mounted within and supported by the collar's cylindrical passage with the drill bit being accessible to the sheet material via the cylindrical passage in the panel.

The fasteners allow the collar to be removed and replaced as desired with a different size collar. As an additional feature, a variety of different collars is included, differing in the diameter of the cylindrical passage, whereby the unit may be adapted as a kit for use with a variety of self-colleting drills having different size collets.

A centering or alignment tool having a cylindrical body sized to matingly engage the cylindrical passage of the selected collar and contains an axially extended cylindrical pin that is sized to matingly fit within the locator hole in the sheet material being worked.

With the alignment tool installed in the collar, the plate may be moved about on the surface of the worked material, until the alignment tools pin finds the locator hole. That is, the alignment tool can be pushed forward axially into the locator hole, thereby centering the collar's cylindrical passage on the locator hole in the sheet material and properly positions the drill plate panel. By exhausting the plate's vacuum chamber, atmospheric pressure presses the plate against the worked material, compressing the seals, until the outer rim portions on the panel's front face abuts the worked material. The drill's collet is then inserted into the cylindrical passage, whereby the drill is supported by the drill plate, and drilling commences.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIGS. 5/5A is a partial section exploded view of the collar, plate and set screw elements that illustrates a preferred fastening structure to join the elements;

DETAILED DESCRIPTION OF THE PREFERRED EMBODIMENTS

As later described in connection with the operation, the cylindrical passage 5 is aligned coaxial with a starter hole that is formed in the worked material. Consequently, it is not necessary to precisely axially align the hole 12 through the plate 2 with that locator hole. So long as the drill bit has sufficient clearance to access the worked material through the hole in the plate 2, slight misalignment between passage 12 and the locator hole should not affect operation.

Figure 1:
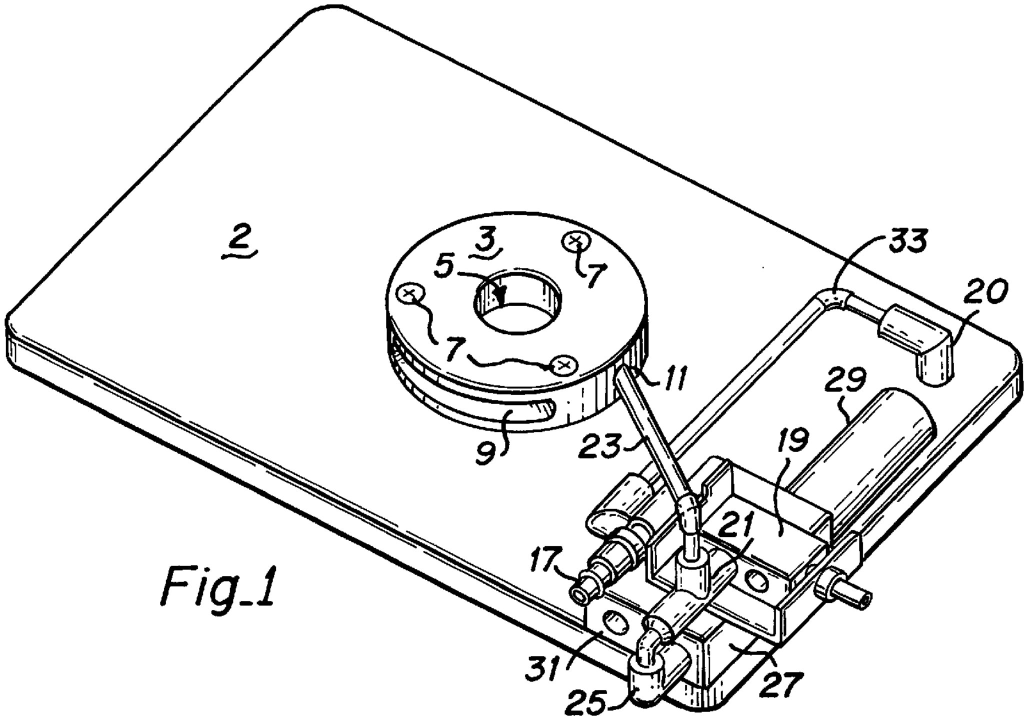
FIG. 1 illustrates the vacuum drill plate in a rear perspective view.
Figure 2:
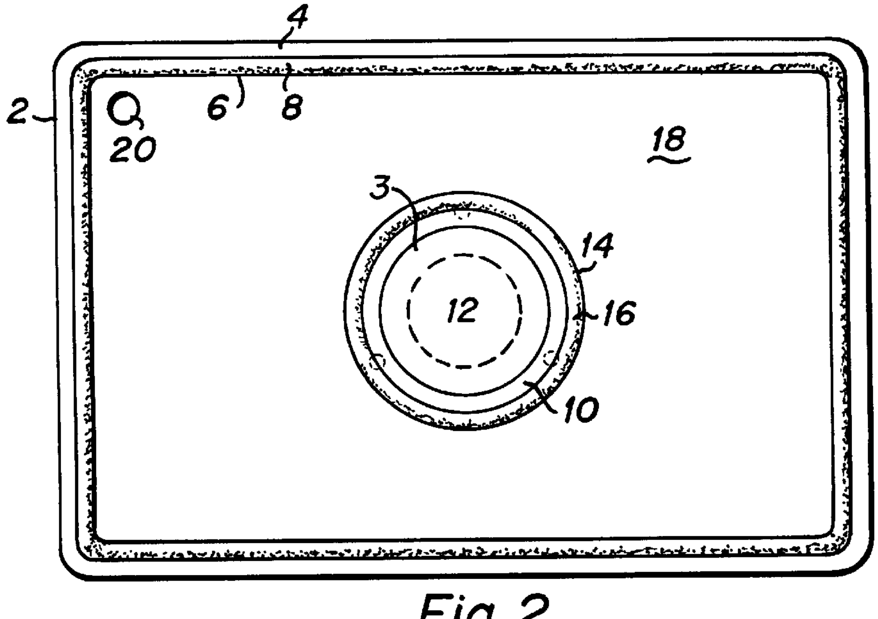
FIG. 2 is a front elevational view of the vacuum drill plate of FIG. 1.

Reference is made to FIG. 1 which illustrates the vacuum drill plate in rear perspective view or rear face and to FIG. 2 which shows an elevational view of the drill plate's front face. The plate includes a panel or base plate 2 formed of a rigid metal plate, suitably aluminum, in a rectangular shape with rounded corners. A short squat cylindrical metal member or collar 3, suitably of steel, is attached to the rear face of the base.

Turning to FIG. 2, the front face of base plate 2 as viewed in FIG. 2 contains a rim portion 4, presenting a rectangle with rounded corners in elevation view, which borders the periphery of the rectangular plate forming a continuous loop. The face of that rim is essentially flat. A surrounding groove 6 is located contiguous to and borders that rim and a continuous seal 8, formed of a compressible resilient material, is seated in that groove.

A cylindrical protuberance containing a rim 10 of cylindrical outline is centrally located on the base plate, and partially defines cylindrical walls of a cylindrical passage 12 that extends through the plate. A portion of collar 3, viewed in FIG. 1 and shown in dash lines, is visible in this view and obstructs a portion of passage 12. The surface of the rim 10 is also flat. A second groove 14 is located on the outside of the cylindrical protuberance and rim 10 and borders that rim. A second continuous seal 16, formed of a compressible resilient material, is seated in that second groove. The intermediate region 18, located in between the seals, contains an additional passage 20 that extends through to the rear face of the plate.

Intermediate region 18 is essentially a planar area that is recessed below the outer surface of outer rim 4, by approximately 30 thousandths of an inch in one practical example. That planar area may be formed in the stock plate by milling. To allow for slight curvature in the worked material the inner circular rim 10 is, preferably, recessed slightly from the plane of the outer rim, by a lesser amount than region 18, suitably by 15 thousandths of an inch in one practical example. This relationship is better illustrated in the partial section view of FIG. 3 to which reference is made.

Figure 3:
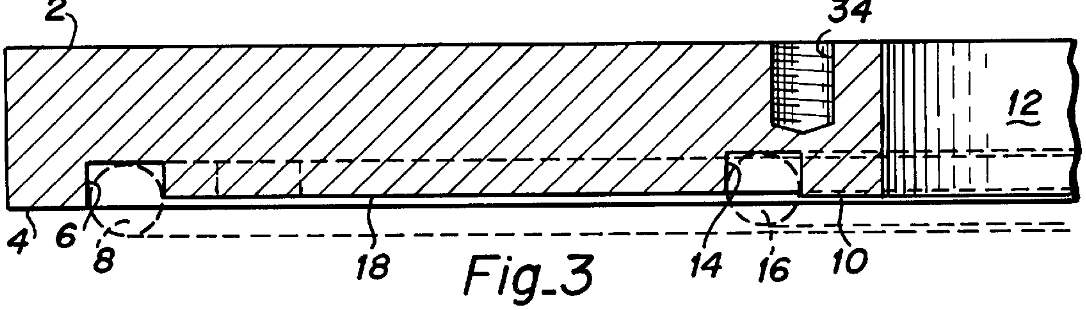
FIG. 3 is a partial section view of the drill plate of FIG. 2 drawn to a larger scale and with the collar element omitted.

FIG. 3 illustrates in larger scale a partial section of the base plate 2 of FIG. 2 taken along a shorter dimension of the base plate, omitting collar 3. For convenience, the seals 8 and 16 are illustrated by dotted lines. It is appreciated that the intermediate region forms a shallow cavity that is open at the front. That cavity is closed when the face of the plate is pressed against a flat surface. So pressed, the seals compress and that shallow cavity becomes essentially vacuum tight. Moreover, the slight depression in the front surface is seen as a minor fraction of the thickness of base plate 2, and, hence, does not significantly alter the base's strength or rigidity. The foregoing surfaces are easily formed from a standard thickness of plate material by conventional milling procedures.

Seals 8 and 16 are continuous; they are formed of a compressible resilient material, suitably Neoprene sponge rubber cord having a one quarter inch diameter. In operation the front face of base 2 is pressed against the sheet surface to be worked, those seals compress, allowing the rim 4 to contact the worked surface, while maintaining a firm vacuum seal for the shallow intermediate region 18.

Reference is again made to FIG. 1. A short cylindrical member or collar 3 is attached to the rear of the base by three set screws 7 inserted within screw passages through the end faces of collar 3 and thread into three equally angularly spaced threaded holes, not illustrated, in base plate 2. The collar includes a central cylindrical passage 5, that is generally axially aligned with the larger cylindrical passage 12 formed in base 2, the latter of which is visible in FIG. 2.

Figure 4:
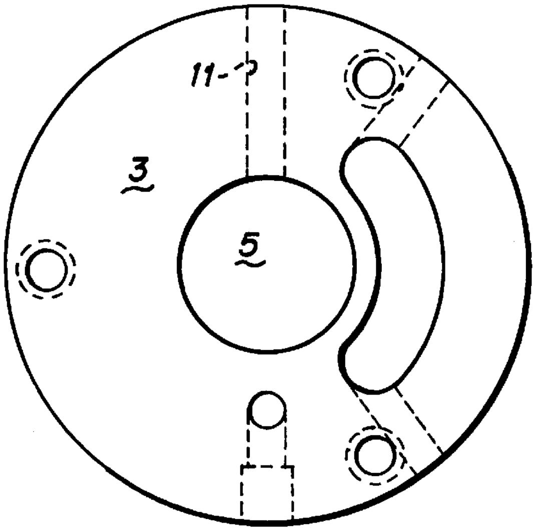
FIG. 4 is a front view of the collar element used in the embodiment of FIG. 1.
Figure 5:
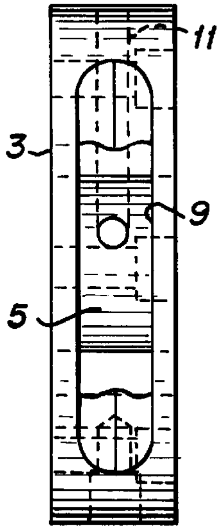
FIG. 5 is a side view of that same element.

Collar 3 contains a slot shaped opening 9 in the cylindrical side wall. That slot angularly extends over a large angle, suitably 108 degrees, in the space between two of the set screws. Slot opening 9 extends radially within and intersects the central cylindrical passage 5, and forms an outwardly flared passage from the central cylindrical passage 5 to the collar's exterior. That flared passage is better illustrated in the front and side views of the collar presented in FIGS. 4 and 5, drawn to an enlarged scale. A smaller passage 11, angularly spaced from passage 5, also enters through the collar's side wall and also extends into the central cylindrical passage from the side. The slot shaped passage forms a chute for exhausting metal chips produced during operation. Passage 11 serves as an air conduit to allow air to enter and blow those metal shavings out through that chute, as later described more fully in the description of operation hereafter.

Figure 5A:
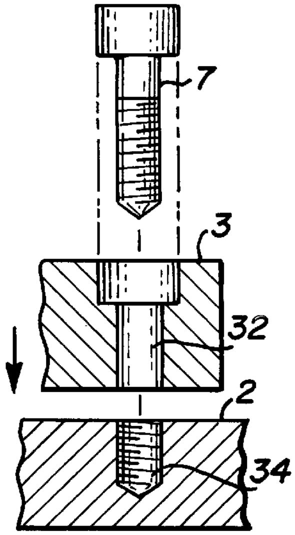

FIG. 5A is an exploded partial section view through base plate 2 and collar 3 taken in the vicinity of one of the set screws 7 that fasten the two elements together. Set screws 7 are chosen to detachably fasten collar 3 to the plate since set screws are strong, reliable and readily available fastener's and less expensive that other fastening devices. The set screws are releasable; and can be removed to permit the collar to be detached and replaced with another collar of a different size, as later herein described.

As those skilled in the art recognized the collar can be affixed permanently to the plate by conventional welding technique. That however, is less preferred, as such permanent affixation limits the assembly to a single size collar, and, hence, different assemblies would need to be constructed for drills of different size collets, which is both costlier and unnecessary.

As illustrated in FIG. 5A the threaded shank of the set screw extends through passage 32 into threading engagement with the threaded passage 34 in base plate 2, which is of a length to accommodate a good portion of the shank. Passage 34 contains a larger diameter portion, shown to the left, and is stepped in geometry, decreasing in diameter at one axial location to the smaller diameter just necessary to accommodate the screw's shank. The larger diameter portion of that passage accommodates the set screw's head, limiting the set screw's axial movement through the passage. Tightening the screw thereby presses the collar into the plate and joins the two elements tightly together. The two remaining fastening structures are identical to the foregoing. It is appreciated that the foregoing is a known fastening arrangement.

Returning again to FIG. 1, an air hose connector 17 connects to the inlet conduit of a manually operated air valve or on-off switch 19. The air hose connector is a standard connector which allows easy releasible connection to the compressed air hose that is available in the manufacturing area and the on-off switch is an available off the shelf component. The outlet of that on-off switch connects to a T connector conduit 21. One arm of that conduit is connected by conduit 23 to air inlet passage 11 in the side of collar 3. The T-connector's other outlet arm is connected via conduit 25 to the inlet of a vacuum generator 27. An air outlet to vacuum generator 27, not visible in FIG. 1, connects to an exhaust muffler or silencer 29, as variously termed. The end of the silencer contains a group of small holes, not visible in the figure, that allows exhaust air to exit.

Figure 7:
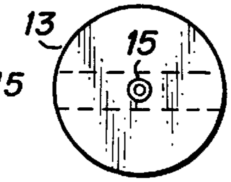

The vacuum generator's vacuum port, not visible in FIG. 1, but pictorially illustrated in FIG. 7, is connected internally within that generator to a vacuum release valve 31, and also to a conduit 33. The latter conduit connects through to an inlet passage 20 through base 2 that opens to the other side of the plate, earlier viewed in FIG. 2. As those skilled in the art recognize, the foregoing are all known elements that are available off the shelf. The assembly is essentially self contained and is easily gripped by hand. The principal elements are located away from collar 3 to avoid any possible interference with the power drill that is to be installed to collar 3.

Figure 8:
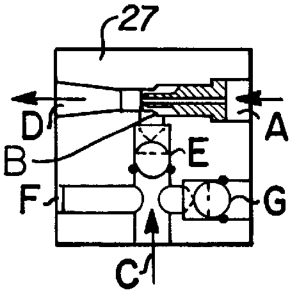
FIG. 8 is a pictorial drawing of a venturi vacuum generator.

A pictorial representation of the Venturi vacuum generator is illustrated in FIG. 8. Venturi blocks convert compressed air, available in the shop, to vacuum by passing compressed air through a small opening. Pressurized air is introduced through the air inlet port A. The air passes through a constricted passage creating a low pressure or vacuum about the end of that passage at B. The latter region connects to the vacuum port C. The vacuum produced in region B draws air up through the vacuum port, thereby creating the vacuum for holding parts.

The flow of air lifts the spring loaded ball check E off its seat until the required vacuum is reached. At that time, the spring loaded ball returns to its seat and seals the vacuum. The pressurized air flow is discharged through the exhaust port D, which is threaded to accept a screw on muffler or silencer, as variously termed, that reduces noise. An additional port F is provided for gaging, which is not used in this invention and is plugged. A second ball check G is located in the vacuum release port. The vacuum may be released by a manual release button. To release the vacuum, the release button physically moves the second check ball G off of its seat, breaking the air tight seal. A suitable vacuum generator is the Stilson company's Venturi vacuum generator model VL-6625.

Figure 9:
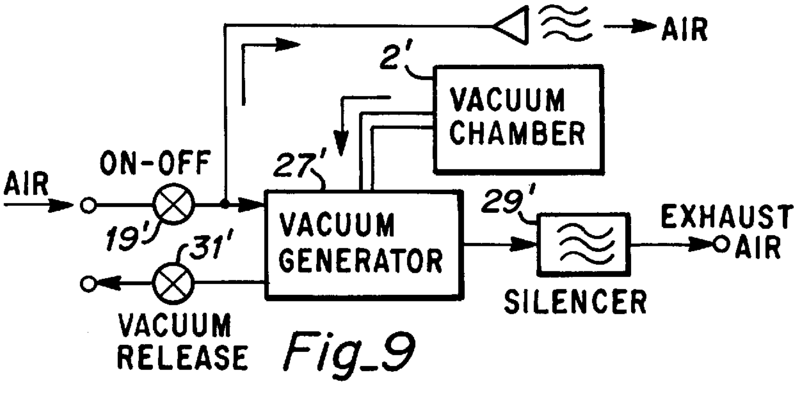
FIG. 9 is a schematic of the elements of the vacuum drill plate of FIG. 1.

To aid in understanding of operation, a simplified schematic drawing of the foregoing vacuum drill plate is illustrated in FIG. 9, wherein the symbol for counterpart elements in the preceeding figures are shown with the same number designation primed.

Figure 6:
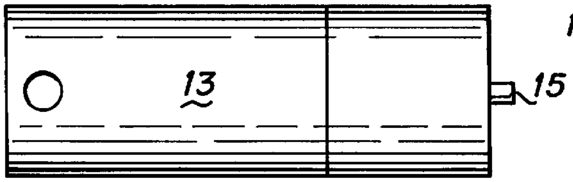
FIGS. 6 and 7 illustrate an alignment tool used with the foregoing, in side and end views, respectively.

For working with locator holes pre-formed in the worked sheet material, the foregoing structure is accompanied by an alignment tool. FIGS. 6 and 7 illustrate an alignment tool for the foregoing assembly in side view and in end view respectively. The tool contains a cylindrical body 13 and contains a cylindrical protuberance or pin 15 that is coaxial with the body. The cylindrical body is sized to just fit within the central cylindrical passage 5 in collar 3; while the protruding pin is of the size of the locator hole drilled into the worked material.

In the manufacturing operation referred to in the preamble to this specification, the sheet material contains predrilled holes, called locator holes. These holes pin-point the location where larger diameter counterbored holes are to be placed. The diameter of the cylindrical pin of the alignment tool is selected to fit in that locator hole with a clearance fit. Since the body of the tool fits coaxially within collar passage 5, when the pin is fit into the locator hole, collar passage 5 is automatically thereby oriented coaxial with that locator hole and the vacuum drill plate is ready for drilling. When working without locator holes, the alignment tool is not used.

In the description of operation which immediately follows it is assumed that the pneumatic drill selected contains the size collet that correctly fits within the collar's passage 5. Thus, in operation, a source of compressed air is connected to connector 17 in the unit and base plate 2 is placed against the worked surface. The passage 5 is centered on the locator hole in that worked surface. To ensure correct alignment, an alignment tool 13 having the appropriate size locator hole rod is inserted through passage 5 and the assembly moved around slightly until the pin of the tool enters the locator hole in the worked material. The on-off switch 19 is then turned on, allowing compressed air to enter vacuum generator 27, and, through a separate branch, into conduit 23 and from that conduit into collar air inlet 11. Expended air exits the vacuum generator from silencer 29. As earlier described, vacuum generator 27 operates on the Bernoulli principle; using fast flowing air to create a low pressure, referred to as a vacuum, at a vacuum port.

Air is aspirated from intermediate region 18 on the face of the base via conduit 33 to place that region essentially in vacuum. Since region 18 is sealed air tight by seals 8 and 16 the recessed region 18 is in vacuum. A large pressure differential is thereby formed across the base plate 2. This is created between the ambient atmospheric pressure on the rear of the plate and the intermediate region, as well as between that intermediate region and the worked material. That atmospheric force on the outside of the drill plate that presses the plate against the worked surface, compressing the seals and engaging outer rim 4 against the worked surface, and produces a strong grip.

The pneumatic drill is inserted into collar 3. The drill contains a self colleting feature that grips the internal surface of the passage 5. By that grip alone, the drill is held in place for drilling. The drill is operated to drill the hole through the worked surface and to countersink that hole, accomplishing both in a single step. In that process, the plate maintains its structural integrity. It supports the drill, a weight of about 22 pounds and is unaffected by the shocks and jerks attendant in drilling with such power tool. Moreover, the drill is a somewhat lengthy tool and extends outwardly some distance, about 18 inches. That produces considerable mechanical moment at the collar. That does not affect the plate either.

Further, in drilling, the drill bit removes metal shavings from the worked material which fall into the central passage in the collar. The compressed air blowing through inlet 11 and into the cylindrical passage, catches the metal shavings and blows them out the chute 9.

When drilling and countersinking is completed, the drill is removed from collar 3. Manual valve 19 is manually turned off by the worker, removing the vacuum source. However, because of the seals, the vacuum persists and the plate remains in place until the pressure release switch 31 is operated to release the vacuum. The plate is gripped by hand and moved in position over to the next locator hole for further drilling. The pressure release valve provides an advantage to the combination. If it is desired to also disconnect the air hose for any reason or if the compressed air supply fails, the plate remains in place, preventing the plate and any installed drill tool from falling. The vacuum remains sufficiently strong and intact, until the pressure release valve is operated.

When the front face of base plate 2 is pressed against the surface of a sheet that is very flat, some slight clearance will exist between the circular shaped rim 10 and the worked surface. This does not produce any difficulty in operation, since pneumatic drills of the type earlier described contain an appropriate depth gage to determine the position of at which the drill makes contact with the worked surface and measures the depth of the drilled hole taken from that gaged starting position, and not from the face of rim 10. When working only on flat material, the slight recession of rim 10 from the plane of outer rim 4 may be eliminated and rim 10 may instead be located in the same plane as the outer rim 4. However, because of the greater versatility available, the former arrangement is preferred.

Base 2 is selected to be of a material and thickness to ensure that the base is sufficiently rigid and does not flex when subjected to the force of air pressure and any shaking of the drill supported by and used therewith. The depth of the vacuum region 18 is only a small fraction of the thickness of the plate. In a practical embodiment of the invention, the depth of the recess is thirty thousandths of an inch in a plate whose thickness is one half inch, a fraction of about six one-hundredths of the thickness or a ratio of thickness to recess depth of 167 to 1. Thus the stiffness and rigidity of the plate is essentially unaffected by the formed cavity. This plate construction thus achieves the goal of providing a vacuum chamber and an inflexible support for both the vacuum chamber and a large drill. The face of the circular rim is recessed from the plane of the rectangular rim by fifteen thousandths of an inch. To minimize wear on the walls of passage 5 due to repeated installation and removal of the pneumatic drill, collar 3 is preferably fabricated from a material that is tougher than aluminum, such as steel.

In one practical example, panel 2 is 12 inches by 8 inches with a rectangular rim 10 that is 0.5 inch wide and is formed of type 6061-T6 aluminum, a general fabrication aluminum. Passage 12 is a diameter of 2.5 inches, and is centered 4.00 inches from the bottom side and 6.00 inches from either side. The circular rim 10 is 0.5 inches wide and is of an outer diameter of 3.0 inches. Circular groove 14 is 0.5 inches wide and is of an outer diameter of 3.5 inches. Metal cylinder 3 is formed of steel and is 3.5 inches in outer diameter. It's central passage 5 is 1.25 inches in diameter.

The foregoing is extremely versatile. One may orient collar 3 to allow metal chips to exhaust to the side, instead of downward, by simply unscrewing the set screws, rotating the collar, and reattaching the collar to the plate. Or the foregoing may be modified to attach a tube to the exhaust slot and exhaust the tube through a standard vacuum cleaner bag to collect the scrap chips and keep the factory floor squeaky clean.

Figure 10:
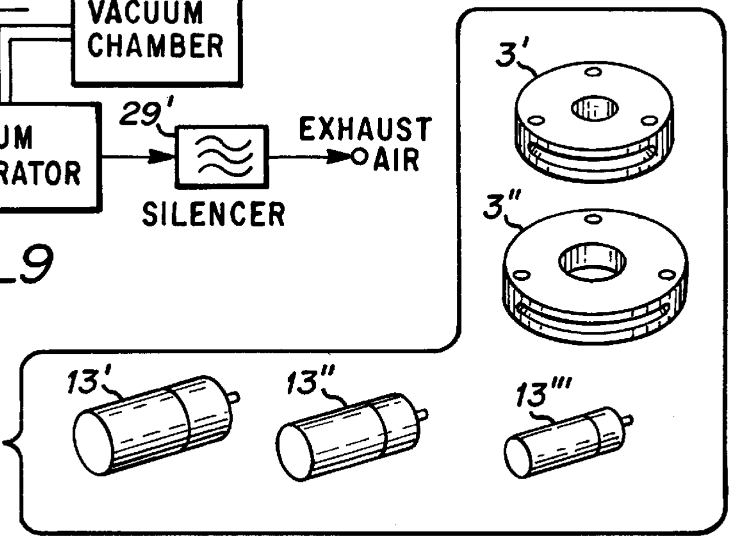
FIG. 10 is a pictorial illustration of the multiple collars and alignment tools supplied with the vacuum drill plate kit.

To maximum the versatility of the foregoing embodiment, as an added feature, the invention may be furnished as a kit. As represented pictorially in FIG. 10, a collection of additional collars containing central cylindrical passages of different diameter, represented by 3' and 3", can be provided for use with a single base plate 2 of FIG. 1. By replacing one collar with another, a drill with a different diameter collet may be used. Further, a collection of different alignment tools, such as represented as 13', 13" and 13'" may be supplied containing alignment tools of different diameter to accommodate a variety of locator holes of different size and different diameter passages 5. As example alignment tool is sized to fit collar 3", while tools 13' and 13'" fit collar 3' and the pins on the latter tools are sized to fit locator holes of two different sizes.

The worker is given the size of the pneumatic drill's collet for the drill that is to be used, selects the appropriately sized collar and fastens that collar with the set screws 7 to base plate 2. That worker is also given the size of the locator holes to be used and an alignment tool of the appropriate diameter to fit the selected collar and containing the appropriate size pin for the locator hole is selected from the collection.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A grip for holding a self colleting power drill to a worked surface, comprising:

a panel, said panel containing front and rear faces; said panel being formed of metal of predetermined thickness and being rigid in characteristic;

a first rim portion extending about said rear face in a closed loop and having a flat rim face;

a cylindrical passage extending through said plate, said cylindrical passage having a first predetermined diameter;

a second rim portion bordering said cylindrical passage, said second rim portion having a flat rim face;

a first groove in said front face, said first groove extending in a closed loop adjacent said first rim portion;

a second groove in said front face, said second groove extending in a closed loop about and bordering said second rim portion;

a first flexible seal, said first flexible seal being seated in and covering said first groove;

a second flexible seal, said second flexible seal being seated in and covering said second groove;

said first and second grooves defining an intermediate region therebetween on said front face of said plate;

said intermediate region being slightly recessed from said rim's faces to define a shallow open cavity;

said seals for providing an air tight border to said intermediate region when said panel is pressed against a worked surface;

vacuum passage means located within said intermediate region extending through to the rear face of said plate;

a metal cylinder having first and second ends, said metal cylinder being affixed to said rear face of said panel with one of said ends abutting said rear face of said panel; said metal cylinder including a inner cylindrical wall defining a cylindrical axially extending passage therethrough between said first and second ends for gripping a oollet of a self-colleting power drill, said cylindrical passage being generally centered with said cylindrical passage in said panel; and said central cylindrical passage being of a second predetermined diameter, said second predetermined diameter being less than said first predetermined diameter, whereby a portion of said cylinder end overlaps into said cylindrical passage in said panel.

2. The invention as defined in claim 1, further comprising fastener means for affixing said metal cylinder to said panel.

3. The invention as defined in claim 2, wherein said fastener means comprise releasable fastener means, wherein said metal cylinder may be removed from said panel by releasing said fastener means.

4. The invention as defined in claim 3, wherein said panel further comprises:

a plurality of at least three threaded passages in said rear face of said panel, said threaded passages being equally spaced about said cylindrical passage in said plate;

wherein said metal cylinder further comprises:

a plurality of at least three access passages extending axially between said first and second faces of said metal cylinder for receiving fastening means; said access passages being equally angularly spaced about said cylindrical passage in said metal cylinder; said access passages being radially spaced from the center of said passage by the same distance as said threaded passages in said plate; and said plurality of access passages being the same in number as said plurality of threaded passages in said panel;

said three access passages in said metal cylinder being aligned with corresponding ones of said threaded passages in said panel; and wherein said releasable fastener means further comprise:

a plurality of at least three set screws for threadingly engaging said threaded passages, said plurality of set screws being the same in number as said plurality of threaded passages.

5. The combination as defined in claim 1, further comprising aspiration means mounted to the rear side of said panel, said aspiration means being connected to said vacuum passage means for at least partially evacuating air from said intermediate region.

6. The combination as defined in claim 4, further comprising aspiration means mounted to the rear side of said panel, said aspiration means being connected to said vacuum passage means for at least partially evacuating air from said intermediate region.

7. The invention as defined in claim 5, further comprising manually operated pressure relief valve means for releasing any vacuum created by said aspiration means.

8. The invention as defined in claim 7, wherein said aspiration means comprises a venturi vacuum generator, said vacuum generator being powered by compressed air supplied at a generator input for producing aspiration at a vacuum port; and, further comprising: manually operable on-off air valve means for controlling supply of compressed air to said aspiration means.

9. The invention as defined in claim 3, wherein said metal cylinder further contains an air inlet and a first laterally extending passage between said central cylindrical passage of said metal cylinder and said air inlet to establish an air passage therebetween into the side of said cylindrical passage of said metal cylinder; and said metal cylinder further containing a laterally extending radially outwardly flared passage, said flared passage extending from said central cylindrical passage in said metal cylinder and defining an elongate arcuate slot in an outer wall of said collar, to provide a chute passage from the side of said central cylindrical passage.

10. The invention as defined in claim 6, wherein said metal cylinder further contains an air inlet and a first laterally extending passage between said central cylindrical passage of said metal cylinder and said air inlet to establish an air passage therebetween into the side of said cylindrical passage of said metal cylinder; and said metal cylinder further containing a laterally extending radially outwardly flared passage, said flared passage extending from said central cylindrical passage in said metal cylinder and defining an elongate arcuate slot in an outer wall of said collar, to provide a chute passage from the side of said central cylindrical passage.

11. A vacuum drill plate assembly comprising:

a generally thick flat rigid metal panel of a generally rectangular shape having rounded corners and comprising a predetermined thickness; said panel containing front and rear faces; said panel being formed of aluminum material of predetermined thickness and being rigid in characteristic;

a first rim portion having a flat rim face bordering the periphery of said front face defining a rectangular frame;

a cylindrical passage extending through said plate , said cylindrical passage having a first predetermined diameter and being centrally located in said panel;

a second rim portion having a flat rim surface and defining a circular frame bordering said cylindrical passage;

a first groove in said front face, said first groove extending in a rectangular path on said front face and adjoining said first rim portion;

a second groove in said front face, said second groove extending in a circular path about and bordering the outer periphery of said second rim portion;

a first seal, said first seal being seated in and covering said first groove;

a second seal, said second seal being seated in and covering said second groove;

said first and second seals being formed of a compressible resilient material;

said first and second grooves defining an intermediate region therebetween on said front face of said plate;

said intermediate region having a flat surface and being slightly recessed from said rim's faces to define a shallow open cavity; said intermediate region being recessed from said outer rim's face by a distance no greater than $6/100$ th's of said predetermined thickness;

vacuum passage means located within said intermediate region extending through to the rear face of said plate;

a collar comprising a short generally cylindrical geometry attached to said rear face of said plate; said collar being centrally located within said rear face;

said collar containing a central cylindrical axially extending passage therethrough, said cylindrical passage being oriented coaxial with said central passage in said panel;

said central cylindrical passage being of a second predetermined diameter, said second predetermined diameter being less than said first predetermined diameter, whereby a portion of said collar overlaps into said passage in said panel;

said collar further containing an air inlet and a first laterally extending passage between said central circular passage and said air inlet to establish an air passage therebetween; and said collar further containing a laterally extending radially outwardly flared passage, said flared passage extending from said central cylindrical passage in said collar and defining an elongate arcuate slot in an outer wall of said collar, to provide a chute.

12. The combination as defined in claim 11, further comprising aspiration means mounted to the rear side of said panel, said aspiration means being connected to said vacuum passage means for at least partially evacuating air from said intermediate region.

13. The combination as defined in claim 12, pneumatic coupling means mounted to the rear side of said panel for providing compressed air to said air inlet of said collar, whereby air is allowed to blow into said collar's central cylindrical passage and out said first laterally extending passage.

14. The combination as defined in claim 13, wherein said aspiration means comprises a venturi vacuum generator, said vacuum generator being powered by compressed air supplied at a generator input for producing aspiration at a vacuum port.

15. The invention as defined in claim 14, wherein said venturi vacuum generator input is coupled to said pneumatic coupling means.

16. The invention as defined in claim 15, further comprising manually operated pressure relief valve means for permitting release of vacuum produced by said vacuum generator means.

17. The invention as defined in claim 16, further comprising manually operable on-off air valve means.

18. The invention as defined in claim 17, wherein said panel further comprises:

a plurality of at least three threaded passages in said rear face of said panel, said threaded passages being equally spaced about said cylindrical passage in said plate;

wherein said metal cylinder further comprises:

a plurality of at least three passages extending axially between said first and second faces of said metal cylinder for receiving fastening means; said passages being equally angularly spaced about said cylindrical passage in said metal cylinder; said passages being radially spaced from the center of said passage by the same distance as said threaded passages in said plate; said plurality being the same in number as said plurality of threaded passages in said panel; and further comprising:

fastening means for fastening said metal cylinder to said rear face of said plate with said cylindrical passage of said metal cylinder oriented coaxial with said cylindrical passage in said panel and with said three passages being aligned with corresponding ones of said threaded passages in said panel;

said fastening means comprising a plurality of at least three set screws, said plurality being the same in number as said plurality of threaded passages.

19. A grip for holding a self colleting power drill to a worked surface, comprising:

a panel, said panel containing front and rear faces; said panel being formed of metal of predetermined thickness and being rigid in characteristic;

a first rim portion extending about said rear face in a closed loop and having a flat rim face;

a cylindrical passage extending through said plate, said cylindrical passage having a first predetermined diameter;

a second rim portion bordering said cylindrical passage, said second rim portion having a flat rim face;

a first groove in said front face, said first groove extending in a closed loop adjacent said first rim portion;

a second groove in said front face, said second groove extending in a closed loop about and bordering said second rim portion;

a first flexible seal, said first flexible seal being seated in and covering said first groove;

a second flexible seal, said second flexible seal being seated in and covering said second groove;

said first and second grooves defining an intermediate region therebetween on said front face of said plate;

said intermediate region being slightly recessed from said rim's faces to define a shallow open cavity;

said seals for providing an air tight border to said intermediate region when said panel is pressed against a worked surface;

vacuum passage means located within said intermediate region extending through to the rear face of said plate;

a metal cylinder having first and second ends, said metal cylinder being affixed to said rear face of said panel with one of said ends abutting said rear face of said panel; said metal cylinder including a inner cylindrical wall defining a cylindrical axially extending passage therethrough between said first and second ends for gripping a collet of a self-colleting power drill, said cylindrical passage being generally centered with said cylindrical passage in said panel;

said central cylindrical passage being of a second predetermined diameter, said second predetermined diameter being less than said first predetermined diameter, whereby a portion of said cylinder end overlaps into said cylindrical passage in said panel;

said metal cylinder further containing an air inlet and a first laterally extending passage between said central cylindrical passage of said metal cylinder and said air inlet to establish an air passage therebetween into the side of said cylindrical passage of said metal cylinder; and said metal cylinder further containing a laterally extending radially outwardly flared passage, said flared passage extending from said central cylindrical passage in said metal cylinder and defining an elongate arcuate slot in an outer wall of said collar, to provide a chute passage from the side of said central cylindrical passage.

20. The invention as defined in claim 19, wherein said panel further comprises:

a plurality of at least three threaded passages in said rear face of said panel, said threaded passages being equally spaced about said cylindrical passage in said plate;

wherein said metal cylinder further comprises:

a plurality of at least three passages extending axially between said first and second faces of said metal cylinder for receiving fastening means; said passages being equally angularly spaced about said cylindrical passage in said metal cylinder; said passages being radially spaced from the center of said passage by the same distance as said threaded passages in said plate; said plurality being the same in number as said plurality of threaded passages in said panel; and further comprising:

fastening means for fastening said metal cylinder to said rear face of said plate with said cylindrical passage of said metal cylinder oriented coaxial with said cylindrical passage in said panel and with said three passages being aligned with corresponding ones of said threaded passages in said panel;

said fastening means comprising a plurality of at least three set screws, said plurality being the same in number as said plurality of threaded passages.

21. A vacuum drill plate assembly comprising:

a generally thick flat rigid metal panel of a generally rectangular shape having rounded corners and comprising a predetermined thickness; said panel containing front and rear faces; said panel being formed of aluminum material of predetermined thickness and being rigid in characteristic;

a first rim portion having a flat rim face bordering the periphery of said front face defining a rectangular frame;

a cylindrical passage extending through said plate, said cylindrical passage having a first predetermined diameter and being centrally located in said panel;

a second rim portion having a flat rim surface and defining a circular frame bordering said cylindrical passage;

a first groove in said front face, said first groove extending in a rectangular path on said front face and adjoining said first rim portion;

a second groove in said front face, said second groove extending in a circular path about and bordering the outer periphery of said second rim portion;

a first seal, said first seal being seated in and covering said first groove;

a second seal, said second seal being seated in and covering said second groove;

said first and second seals being formed of a compressible resilient material;

said first and second grooves defining an intermediate region therebetween on said front face of said plate;

said intermediate region having a flat surface and being slightly recessed from said rim's faces to define a shallow open cavity; said intermediate region being recessed from said outer rim's face by a distance no greater than 6/100 th's of said predetermined thickness;

vacuum passage means located within said intermediate region extending through to the rear face of said plate;

a collar comprising a short generally cylindrical geometry attached to said rear face of said plate; said collar being centrally located within said front face;

said collar containing a central cylindrical axially extending passage therethrough, said cylindrical passage being oriented coaxial with said central passage in said panel;

said central cylindrical passage being of a second predetermined diameter, said second predetermined diameter being less than said first predetermined diameter, whereby a portion of said collar overlaps into said passage in said panel;

said collar further containing an air inlet and a first laterally extending passage between said central circular passage and said air inlet to establish an air passage therebetween;

said collar further containing a laterally extending radially outwardly flared passage, said flared passage extending from said central cylindrical passage in said collar and defining an elongate arcuate slot in an outer wall of said collar, to provide a chute;

a compressed air inlet connector for connection to a source of compressed air;

on-off toggle operated air valve means; said on off toggle air valve means having an inlet connected to said air inlet connector for receiving compressed air and for communicating air received at said inlet to said outlet when operated to an on position;

Venturi vacuum generator means; said vacuum generator means having an air inlet, an air outlet and a vacuum port;

T-connector means having an input coupled to said output of said on off toggle switch, and having first and second outlets;

first conduit means connecting said first T-connector outlet to said Venturi vacuum generator's air inlet for communicating compressed air from said toggle switch to drive said Venturi vacuum generator;

second conduit means connecting said T-connector's second outlet to said air inlet of said collar for communicating compressed air from said toggle switch into said collar's central passage and, thereby into said collar's laterally extending passage; and conduit means connecting said Venturi vacuum generator's vacuum inlet to said vacuum passage in said panel for aspirating air from said intermediate region of said panel;

exhaust muffler means, said exhaust muffler means being connected to said vacuum generator's air outlet to exhaust compressed air exhausted by said vacuum generator to the exterior; and a manually operated pressure relief valve, said pressure relief valve being connected to said vacuum generator for admitting exterior air into said vacuum inlet to destroy any vacuum in said intermediate region.

22. The combination as defined in claim 21, further comprising:

a centering device, said centering device containing a cylindrical body having a diameter to clearance fit said cylindrical passage, and a short cylindrical pin, coaxial of said cylindrical body, protruding from a cylindrical end face of said body, said pin being sized to clearance fit said locator hole.

* * * * *

UNITED STATES PATENT AND TRADEMARK OFFICE
CERTIFICATE OF CORRECTION

PATENT NO. : 5,807,034
DATED : September 15, 1998
INVENTOR(S) : Perlmutter el al.

It is certified that error appears in the above-identified patent and that said Letters Patent is hereby corrected as shown below:

Title page, item [57]
In the Abstract, line 9, "collating" should read --colleting--.

Column 10, line 54, "oollet" should read --collet--.

Column 16, line 39 , begin a new sub-paragraph with "a".

Signed and Sealed this

Twenty-ninth Day of December, 1998

Attest:

BRUCE LEHMAN

Attesting Officer

Commissioner of Patents and Trademarks